Figure 1:
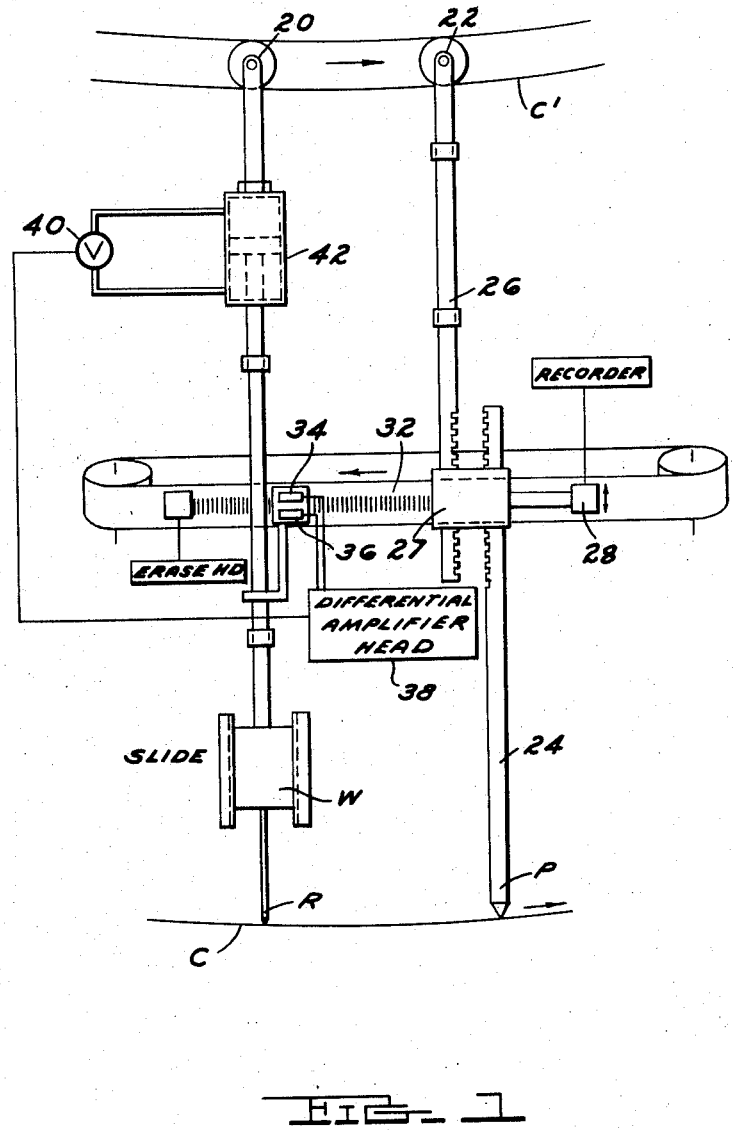

Sept. 29, 1964    J. H. BREMS    3,150,624
METHOD AND APPARATUS FOR WELDING JOINTS
Filed Oct. 16, 1958    4 Sheets-Sheet 1

INVENTOR.
JOHN H. BREMS
BY
Barnes, Kisselle, Raisch & Choate
ATTORNEYS

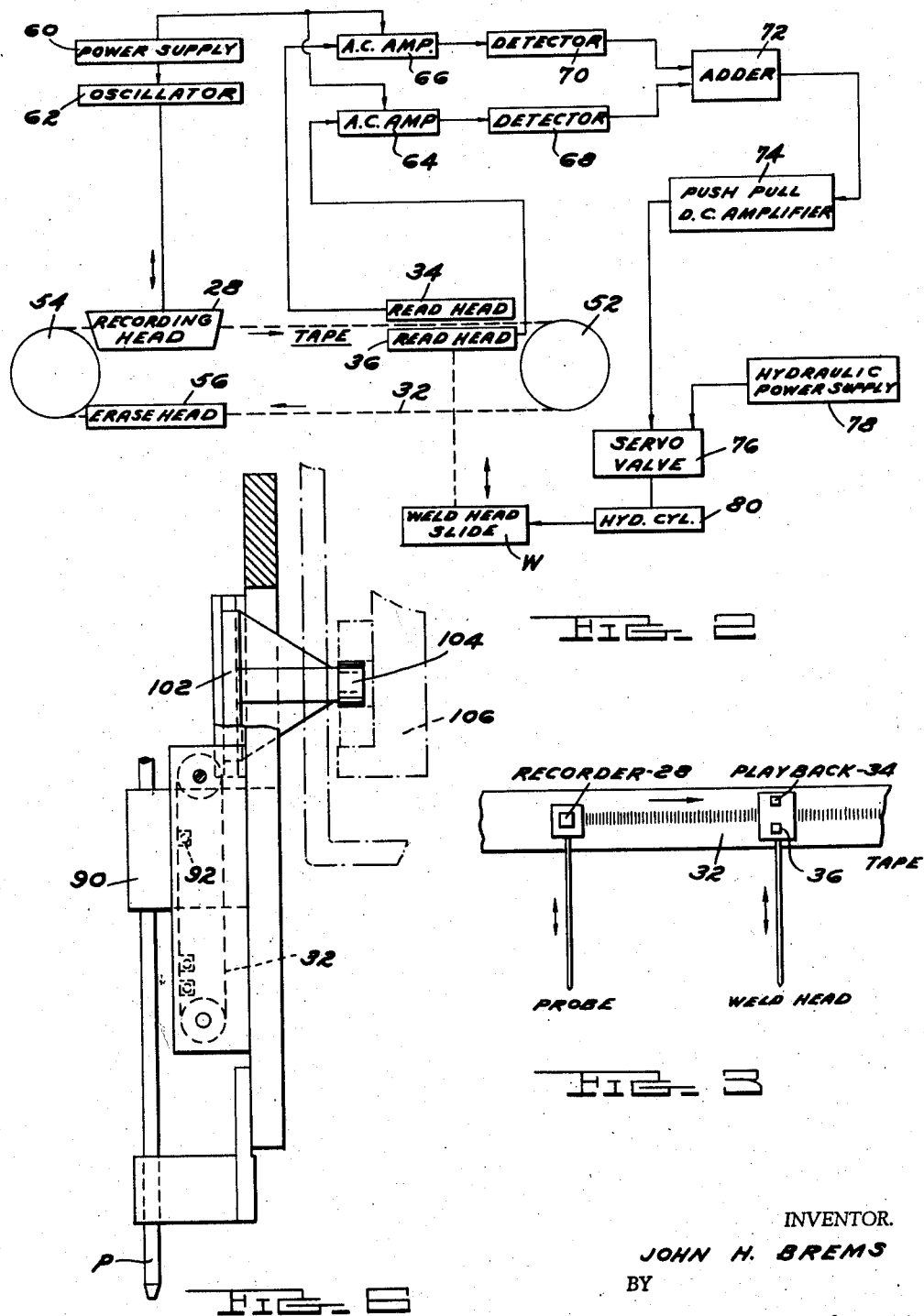

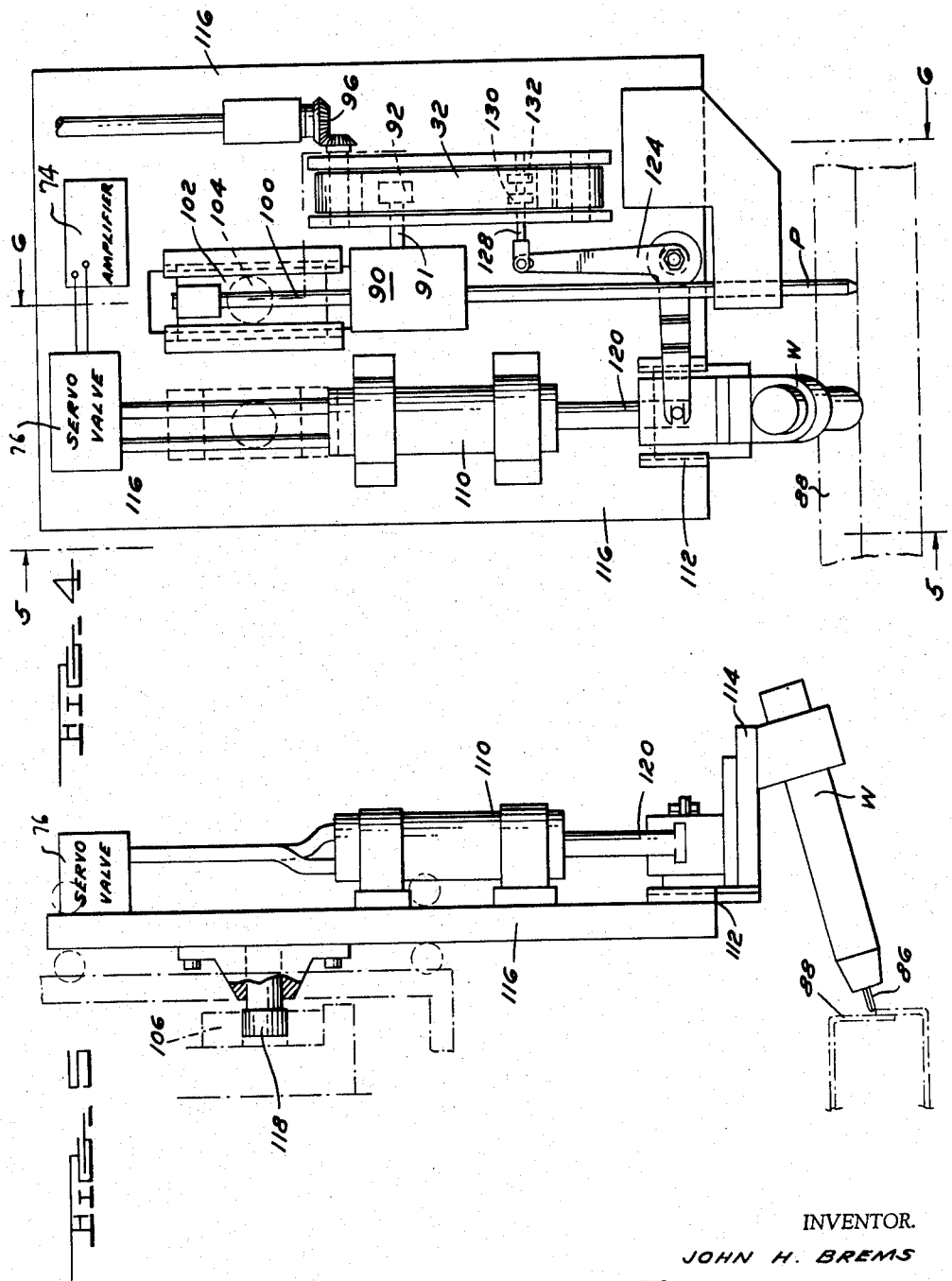

Sept. 29, 1964            J. H. BREMS            3,150,624
METHOD AND APPARATUS FOR WELDING JOINTS
Filed Oct. 16, 1958                          4 Sheets-Sheet 4
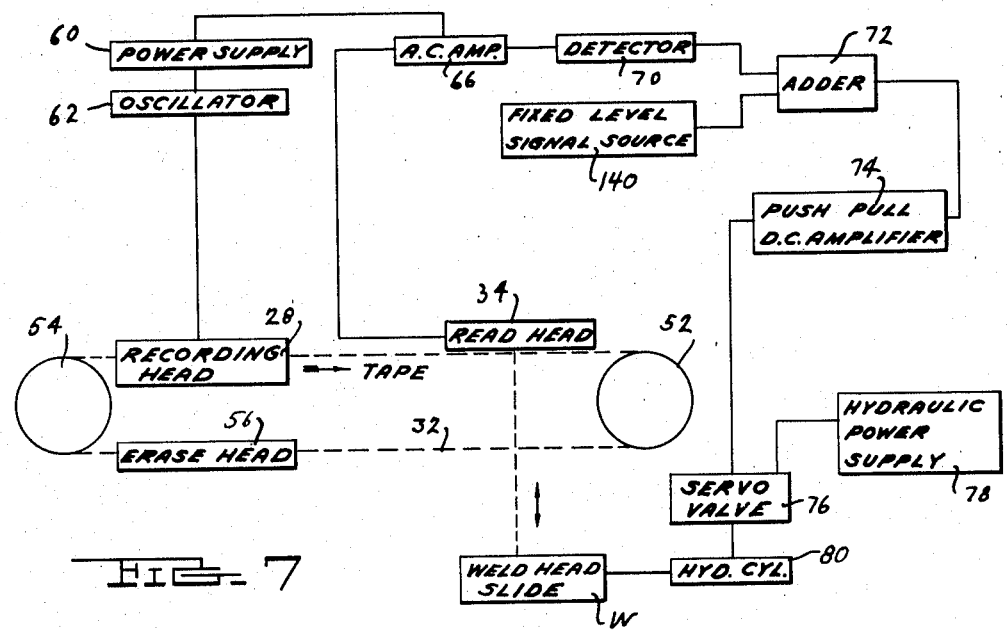
FIG. 7
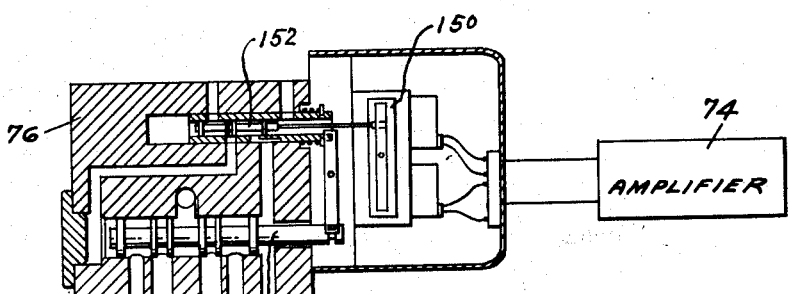
FIG. 8
INVENTOR.
JOHN H BREMS
BY
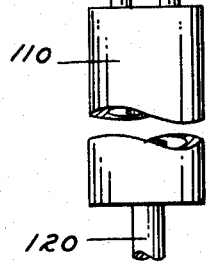
ATTORNEYS United States Patent Office 3,150,624
Patented Sept. 29, 1964

3,150,624
METHOD AND APPARATUS FOR
WELDING JOINTS
John H. Brems, Detroit, Mich., assignor to Motomation,
Inc., Detroit, Mich., a corporation of Michigan
Filed Oct. 16, 1958, Ser. No. 767,577
24 Claims. (Cl. 113—124)

This patent disclosure is directed to a welding machine. It relates particularly to a machine for controlling a work head or tool to follow a meandering course with sufficient accuracy to insure a good well between adjoining parts.

Many manufacturing operations, including a welding operation, involve following a curved line with a reasonable degree of accuracy. In addition the line, as planned for production, may vary from the plan due to manufacturing tolerances. This is especially true where forming operations are involved such as bending of heavy pieces. For example, an automobile frame piece has irregular curvatures which are accurately planned but the edge of a completed frame may vary materially from this plan because of inaccurate cutting of the original stock and discrepancies which develop in the forming operations.

The present disclosure is directed to a tracing head mechanism which will follow a defined contour as planned and which will compensate for any errors which have developed in the manufacture of the particular part. While the device may be adapted to other manufacturing operations than welding, it is described herein particularly in connection with a welding head which is movable in a path along a part.

An object of the invention is the provision of a device to accomplish the purpose outlined in the most economical manner.

It is an object of the device to provide a mechanism for recording intelligence in response to a physical contour and utilizing that intelligence after a predetermined delay which can be controlled to actuate a tool in the defined contour.

It is an object also to provide a device for recording this intelligence in a lineal path with lateral variations and utilizing either a double pick-up head for reading back the signal or a single head related electrically to a fixed signal.

It is a further object of the invention to utilize a differential mechanism in the reading apparatus so that the compensation required for the recording device is actually an increment of the total movement of the tool.

Other objects of the invention relating to details of construction and operation will be apparent in the following description and claims.

Drawings accompany the disclosure and the various views thereof may be briefly described as:

FIGURE 1, a diagrammatic view of an apparatus for welding on a curved line.

FIGURE 2, a diagrammatic view of a series of electrical components in the apparatus for a null-balance system.

FIGURE 3, an enlarged view of the recorder head and probe head.

FIGURE 4, a view of a mechanism for effecting the mechanical motions necessary in the operation of the device.

FIGURE 5, a sectional view on line 5—5 of FIGURE 4.

FIGURE 6, a sectional view on line 6—6 of FIGURE 4.

FIGURE 7, a diagrammatic view of a circuit for a modified null-balance system.

FIGURE 8, illustrates diagrammatically the amplifier, servo-valve, and piston arrangement.

The fundamental system utilizes a magnetic tape with a memory signal which will cause response in a work head or tool to cause it to follow a curve having any reasonable variation.

Where the contour to be followed has large sweeps or curves the device contemplates a master or design cam to move the work head in the basic pattern and a probe with a memory device for moving the head to compensate for manufacturing variants in the basic pattern.

Referring to FIGURE 1, for example, the work curve C is duplicated in the cam $C^1$ at the top of the drawing. The work head W carrying for example a welding rod R is moved in the path C and $C^1$ by the cam follower 20. At the same time a work probe P is moving along ahead of the work part and a cam follower 22 follows the design curve $C^1$. The probe P and the follower 22 are connected by shafts 24 and 26 to a differential mechanism 27 which controls the position of a recording head 28 relative to a moving magnetic tape 32. Variations in the path C and $C^1$ are reflected in motion of the differential output shaft which carries the head 28.

An alternating current signal of some suitable non-critical frequency is placed on the tape and only the variations between the curves C and $C^1$ will cause displacement of the signal transversely on the tape. A follower device having two spaced pick-up heads 34, 36 reflects the transverse displacement in a stronger signal to one or the other. This inequality of signals is reflected in an A.C-D.C differential amplifier 38 and the signal transmitted to a valve 40 controlling a piston motor 42 which shifts the work head W relative to the follower 20 to compensate for the recorded error. An electric motor and gear or screw combination could be used to replace the hydraulic cylinder valve combination to shift the work head.

The tape speed is controlled by gearing or belts or servo-motors to achieve a speed such that it takes the same time for the tape to traverse the space between the recording and reading heads, as it takes for the welding head to traverse the distance between the probe and welding head.

The electrical system is illustrated diagrammatically in FIGURE 2 wherein the tape 32 passes in the direction of the arrows around the wheels 52 and 54. An erase head 56 clears the tape before it passes around the wheel 54 to the recording head 28, which receives a signal from a power supply 60 and an oscillator 62; this alternating signal on the tape will be positioned laterally, dependent on the position of the recording head 28 (see FIGURE 1) as influenced by the cam follower 22 and the probe P. The reading heads 34 and 36 which are mounted mechanically on the welding head are connected to A.C. amplifiers 64 and 66 and then through amplitude detector circuits 68 and 70 to an adding circuit 72 leading to a push-pull D.C. amplifier 74. It should be noted that this system is not dependent on either the amplitude or the frequency of the signal on the tape. Rather it is dependent only on the lateral position of the signal on the tape. Accordingly, the amplifier and detector circuits are non-critical and can be quite non-linear without adversely affecting system operation as is a characteristic of null-balance systems. This amplifier is connected to a servo-valve 76 receiving hydraulic power from a supply 78. The valve controls a hydraulic cylinder 80 which actuates the weld head slide W to control the point of application of the weld.

Thus if the probe has resulted in a lifting of the recorder 28 so that the signal is high on the tape 32 as viewed in FIGURES 1 and 2, the reading head 34 will receive a stronger signal than reading 36 which, through the system outlined above, will cause an ultimate raising of the welding head W and playback heads 34, 36 by the hydraulic cylinder, until the signals received by heads 34, 36 are identical. This movement is identical with the lateral movement previously experienced by the recording head. Similarly, if the probe shuold drop as a result of work irregularity, then the system will cause a delayed response in the weld head to a lowering position.

In FIGURES 4, 5 and 6 a machine is illustrated which can be used for the application of the apparatus to a welding operation. A welding head W has a contact 86 on a work part 88. Probe P is connected to a differential in housing 90, details of the differential being standard and not shown. On the differential output shaft 91 recording head 92 is fastened adjacent a tape 32 driven through a suitable drive mechanism 96. Extending upwardly from the differential housing 90 is a shaft 100 connected to a slide 102 which has on it a cam follower 104 to ride in the groove of a design contour cam 106 (FIGURE 6). The probe P and shaft 100 comprise the two inputs to the differential and the movement of the output shaft 91 is the algebraic sum of the movements of probe P and shaft 100. Thus, only the differences between the design contour and the work line of the part will be reflected in the horizontal positioning of the arm 91 as viewed in FIGURE 4.

The vertical position of the weld head or tool as viewed in FIGURES 4 and 5, is determined by the hydraulic piston cylinder unit 110 which controls the position of the slide 112, relative to the main carriage 116. The welding head W is mounted by an arm 114 on slide 112. The slide 112 is slidably positioned relative to the carriage 116 which has a cam follower 118, moving in the work design contour cam 106 (FIGURE 5). Any errors in the actual work piece 88 detected by the probe P will be compensated for by a shifting of the piston in the cylinder 110 as a result of the action of the response system including the amplifier and the servo valve (FIGURE 8). A piston rod 120 connects the piston with the slide 112. This slide 112 is also connected to a bell crank lever 124 anchored on carriage 116. The other end of the bell crank is connected to a horizontal slide 128 on carriage 116 carrying the double reading heads 130 and 132. Thus, there will be a response in the motion of the reading heads to nullify the discrepancy signal transmitted by the probe once the welding head has moved to proper position relative to the work.

While the device described is used as a true null-balance system, it can be used as a biased modified null-balance system. In this case, as illustrated in FIGURE 7, the circuit used only one read head which rides one side of the recorded trace sufficiently close to generate a signal sufficient to buck a fixed reference signal of suitable magnitude. The modified null-balance system is usable in many applications and has only the disadvantage of being accuracy sensitive to the amplitude of the original recording trace which may be affected by voltage changes and other variaions in the circuit. As shown in FIGURE 7, the circuit is identical with that described in connection with FIGURE 2 with the exception that a fixed level signal source 140 is substituted for the second reading head and its amplifier and detector.

While the device has been described in connection with single plane correction, it could be used in the same manner for two or three dimensional correction. Furthermore, the probe may be a sensing probe actuated by light, magnetics, or electrostatics rather than by physical contact. Also, in place of the hydraulic valve it would be possible to substitute the equivalent devices of electric motor or electric clutch arrangements or air motors. Likewise, the differential control may be used without the tape delay for first order correction of error.

In FIGURE 8, there is shown in diagrammatic presentation of a servo-valve 76 wherein a torque motor 150 responsive to signal from the amplifier 74 actuates a pilot valve spool 152 which controls a main valve spool 154 directing pressure to piston motor 110. This valve is described more fully in Vickers Bulletin 58–74 on Electro-Hydraulic Industrial Servo Valve, Series E–11089–4 copyright, 1958, Vickers, Inc., Detroit, Michigan.

This type of electrohydraulic servo valve is also disclosed in U.S. Patent No. 2,767,689, to W. C. Moog, Jr., issued October 23, 1956.

I claim:

1. The method of controlling the path of a tool in response to a physical condition of a work piece which comprises, a first step, while recording a signal on a magnetic tape, of physically varying the position of the signal laterally on said tape in response to the condition to be recorded, utilizing a double pick-up head to detect electrically the lateral variations of said signal on said tape, and controlling a tool in relation to said work piece by utilizing a null-balance electrical system for actuating a response to the physical variation of said signal on said tape.

2. The method of controlling the path of a tool in response to a physical condition of a work piece which comprises, a first step, while recording a signal on a magnetic tape, of physically varying the position of the signal laterally on said tape in response to the physical condition to be recorded, utilizing a pick-up head to detect the lateral variations of said signal on said tape, and controlling a tool in relation to said work piece by utilizing a fixed signal source in an electrical circuit to balance a signal from said single pick-up head to obtain a physical response to the lateral variations of said signal on said tape.

3. The method of following discrepancy variations in a contoured path of a work part which comprises scanning the difference between the planned design and the actual contour in a continuous motion, recording said difference continuously in a data line varying in contour in a mechanical motion, reading said recorded difference by determining the physical location of the data line, and using a motion identical to the recorded difference to move a follower part along the actual contour.

4. A control device for an instrument which is moving in a predetermined lineal path and which is movable transversely to that path which comprises a magnetic tape, an instrument to be positioned relative to a work piece, means responsive to the physical shape of a path to be traveled for recording a lineal signal on said tape with lateral variations responsive to said shape, a double pick-up head for an electrical reading circuit having a head disposed on either side of said lineal path wherein said heads are electrically responsive to a degree proportional to the proximity of said signal to said head, and electrical means responsive to the variation of signal recorded in said heads for causing a shift of said instrument a predetermined time after the recording of said shape.

5. A control device for an instrument which is moving in a predetermined lineal path and which is movable transversely to that path, which comprises a magnetic tape, means responsive to the path to be traveled for recording a lineal signal on said tape with lateral variations responsive to an intelligence source, a single reading head disposed adjacent said tape responsive to the signal recorded thereon, and an electrical circuit containing a fixed level signal biased electrically against said read head and means responsive to the signals in said electrical circuit for causing a shift of said instrument responsive to the path of the signal recorded on said tape.

6. A control device for an instrument which is moved in a predetermined lineal path and which is movable transversely to that path, which comprises a magnetic tape, an instrument to be positioned relative to a work piece, means responsive to physical shape of a path to be traveled for recording a lineal signal on said tape with lateral variations responsive to said shape, pick-up means disposed adjacent said tape responsive electrically in a degree proportional to the proximity of the recorded signal on said tape, means proportionately responsive to the signal in said pick-up means and connected to said instrument for causing a shift in the position of said instrument so that it will move relative to the work in relation to the path of the signal recorded on said tape, and means for creating a relative lineal motion between said tape and said pick-up means at a rate to delay the response to said recording in said pick-up head a predetermined amount.

7. A device as defined in claim 6 in which the means responsive to the path to be traveled comprises a recording head, a probe means for following the path to be recorded, and means connecting said probe means and said recording head such that the recording head is physically shifted relative to said tape in response to the relationship of said probe to the path to be traveled.

8. An apparatus for performing a continuous work operation on a part such as welding a continuous seam in a work part having a design contour and an actual contour varying from said design contour which comprises an operating head having an instrument movable along a continuous path on a part, means movable according to the design contour of said path, means responsive to the actual contour of said path on such work part, and means responsive to the variations reflected in the motion of said last two means between said design path and said actual path for controlling the position of said instrument relative to said part.

9. A device as defined in claim 8 in which said last-named means comprises, a differential mechanism responsive to the relative motions caused by variations between said design path and said actual path and means connecting said differential mechanism to said instrument.

10. A device as defined in claim 9 in which the response to variations between the design contour and the actual contour is delayed by a tape recording and reading means.

11. A device as defined in claim 9 in which said means comprises, a magnetic tape movable in a lineal path, a recording head responsive to the motion of said differential mechanism for recording a lineal signal on said tape with lateral variations responsive to the differential between said paths, and electrical reading means disposed adjacent said tape electrically responsive to the signals on said tape to a degree proportional to the proximity of said signals, and electrical actuating means responsive to the signal of said reading head for shifting a work instrument relative to a work part.

12. A device as defined in claim 11 in which the signal transmitted to said instrument is delayed by a predetermined relative motion between said tape, said recording head and said reading head.

13. A control device for creating a response to recorded intelligence which comprises a means for recording intelligence in a substantially lineal path varying laterally to specific conditions recorded, and means for reading the recorded intelligence recorded by said first means responsive to the lateral variations in said lineal path comprising response means on either side of said path affected by the proximity of said path, and means to combine the response of said last means to effect reproduction of conditions similar to those recorded.

14. A device as defined in claim 13 in which the first means is a recording head and magnetic tape, the second means is a pair of magnetic reading heads mounted in spaced relation near said tape, and said last means comprises an electrical response system for algebraic adding of signals from said spaced heads.

15. A device as defined in claim 14 in which means is provided to control the relative motion of the heads and the tape to control the time of response to the recorded intelligence.

16. In an apparatus for performing a continuous work operation on a part such as welding a seam in which a work piece and an a tool are movable relative to each other, a support, a tool movably mounted on said support for application to said work piece, a probe movably mounted on said support for reading the condition of said part ahead of said tool, means to guide said support relative to said work in a predetermined path, and means for shifting said tool relative to said work in response to the reading of said probe comprising a magnetic tape, means on said support for mounting and moving said tape in a continuous path, means on said support actuated by movement of said probe for recording a signal on said tape longitudinally thereof, the location of said signal transversely of said tape being responsive to the reading of said probe, a pair of pickup heads mounted on said support adjacent the path of said tape spaced transversely of said tape, and means on said support responsive to the signals in said pick-up heads to shift said tool to a degree dependent on the relative difference in signal response on said pick-up heads.

17. A control device for an instrument which is moving in a predetermined lineal path and which is movable transversely to that path, which comprises a magnetic tape, means responsive to the path to be traveled for recording a lineal signal on said tape with lateral variations responsive to said path, and pick-up means disposed adjacent said tape in transversely spaced relation responsive in their signals to the proximity of the recorded signal on said tape, and means proportionately responsive to the signal in said pick-up means for causing a shift in said instrument so that it will follow the path of the signal recorded on said tape.

18. In a machine for performing a work operation on a work part in a path determined by the shape of the part, a control device which comprises a magnetic tape, means for recording a signal longitudinally of said tape having a contour directly related to the path to be followed on the work part, pick-up means disposed adjacent said tape responsive to the contour of the signal recorded thereon, and means responsive to the signal on said pick-up means to shift an instrument for performing a work operation on said part.

19. A mechanism for performing a work operation along a predetermined path on a work part which comprises a tool instrument for performing the operation on the part, a primary control for said instrument for moving it in a path substantially similar to that to be followed on the work part, and control means for varying the path of said instrument from said first path to the actual path to be followed on said work piece in response to the actual contour of said work piece which comprises a probe means responsive to the actual contour of said work piece, power means to shift said instrument incrementally from said first path, a magnetic tape, and means to move said tape in a predetermined motion, a recording head responsive to said probe to record a lineal signal on said tape, means responsive to the contour of said first path for influencing said recording head to record incremental variations between said work part and said first path, and a pick-up means responsive to the location of said recording signal on said tape operatively associated with said power means to shift said instrument in response to the actual contour of said work part.

20. The method of controlling the path of a tool relative to a work piece which comprises:
   (a) a first step of recording, on a magnetic tape, a lineal signal having a physical location on said tape determined by the variation between a design curve and an actual curve to be followed,
   (b) a second step of picking up that signal at spaced points adjacent the tape in varying degrees of intensity depending on the locations of the signal on the tape relative to the pick-up points,
   (c) a third step of transferring said signals from said spaced pick-up points to a directional power transmission mechanism to move a tool relative to a work piece in response to the location of the lineal signal on the tape.

21. An apparatus for controlling the path of a tool relative to a work piece to permit the following of an actual contour relative to a design contour which comprises in combination with a work piece:
   (a) first means forming a control path adjacent a work piece in the shape of the actual design intended for the work piece,
   (b) support means adjacent said first means mounted to move generally in the direction of said control path,
   (c) a magnetic tape system on said support means to move a tape lineally relative to said support means in synchronization with the motion of said support means relative to a work piece and said control path,
   (d) a recording head on said support means positioned to record a magnetic signal on said tape,
   (e) means movably supporting said recording head on said support means comprising a probe on said support dependent for a position relative to said support on the actual contour of a work piece, a follower on said support dependent for a position relative to said support on the contour of said control path, and means responsive to the relative motion of said probe and follower to position said recording head laterally relative to said moving tape whereby a signal on said tape will vary laterally on said tape depending on the degree of relative motion between said probe and said follower,
   (f) a tool movably mounted on said support downstream from said probe for motion toward and away from a work piece,
   (g) servo means on said support for shifting said tool relative to said work in response to electrical signals,
   (h) electrical pick-up means on said support located adjacent said tape downstream of said recording head to pick up signals from said tape varying in intensity in relation to the lateral position of said signal on said tape, and
   (i) means responsive to the pick-up signals for transmitting proportional signals to said servo means to control the position of said tool as it progressively overtakes the probe positions.

22. An apparatus for controlling the path of a tool relative to a work piece to permit the following of an actual contour relative to a design contour which comprises in combination with a work piece:
   (a) first means forming a control path adjacent a work piece in the shape of the actual design intended for the work piece,
   (b) support means adjacent said first means mounted to move generally in the direction of said control path,
   (c) a magnetic tape system on said support means to move a tape lineally relative to said support means in synchronization with the motion of said support means relative to a work piece and said control path,
   (d) a recording head on said support means positioned to record a magnetic signal on said tape,
   (e) means movably supporting said recording head on said support means comprising a probe on said support dependent for a position relative to said support on the actual contour of a work piece, a follower on said support dependent for a position relative to said support on the contour of said control path, and means responsive to the relative motion of said probe and follower to position said recording head laterally relative to said moving tape whereby a signal on said tape will vary laterally on said tape depending on the degree of relative motion between said probe and said follower,
   (f) a tool movably mounted on said support downstream from said probe for motion toward and away from a work piece,
   (g) electrical pick-up means on said support located adjacent said tape downstream of said recording head to pick up signals from said tape varying in intensity in relation to the lateral position of said signal on said tape, and
   (h) means responsive to the pick-up signals connected to said tool to control the position of said tool as it progressively overtakes the probe positions.

23. An apparatus for controlling the path of a tool relative to a work piece to permit the following of an actual contour relative to a design contour which comprises in combination with a work piece:
   (a) first means forming a control path adjacent a work piece in the shape of the actual design intended for the work piece,
   (b) support means adjacent said first means mounted to move generally in the direction of said control path,
   (c) a magnetic tape system on said support means to move a tape lineally relative to said support means in synchronization with the motion of said support means relative to a work piece and said control path,
   (d) a recording head on said support means positioned to record a magnetic signal on said tape,
   (e) means movably supporting said recording head on said support means comprising a probe on said support dependent for a position relative to said support on the actual contour of a work piece, a follower on said support dependent for a position relative to said support on the contour of said control path, and means responsive to the relative motion of said probe and follower to position said recording head laterally relative to said moving tape whereby a signal on said tape will vary laterally on said tape depending on the degree of relative motion between said probe and said follower,
   (f) a tool movably mounted on said support downstream from said probe for motion toward and away from a work piece,
   (g) electrical pick-up means on said support located adjacent said tape downstream of said recording head to pick up signals from said tape varying in intensity in relation to the lateral position of said signal on said tape,
   (h) means responsive to the pick-up signals connected to said tool to control the position of said tool as it progressively overtakes the probe positions, and
   (i) means connecting said recording head and said work head to shift said heads responsively to nullify the discrepancy signal as the probe and work head progress along the work.

24. In a servo-controlled follower system of the type using a contact probe and having a follower such as a work tool, that improvement which comprises:
   (a) a support adapted to move in a defined path relative to a work piece,
   (b) a probe on said support to contact a work piece while moving relative thereto, (c) means on said support for moving a magnetic tape in a continuous path,
(d) means associated with the probe for recording a signal on said tape extending longitudinally of the tape and varying in its lateral position on the tape depending on the position of the probe,
(e) pick-up means on said support adjacent said tape responsive electrically to a degree proportional to the distance between the recorded signal and the pick-up head laterally of the tape,
(f) a follower device on said support for varying a work tool, and
(g) means actuated by said electrical response for shifting said follower device relative to a work piece.

References Cited in the file of this patent

UNITED STATES PATENTS

| | | |
|---|---|---|
| 2,628,539 | Neergaard | Feb. 17, 1953 |
| 2,690,373 | Osgood | Sept. 28, 1954 |
| 2,721,989 | Gates et al. | Oct. 25, 1955 |
| 2,724,036 | Hess | Nov. 15, 1955 |
| 2,827,547 | Tiedemann | Mar. 18, 1958 |
| 2,861,234 | Martin et al. | Nov. 18, 1958 |
| 2,927,992 | Bateman | Mar. 8, 1960 |

FOREIGN PATENTS

| | | |
|---|---|---|
| 1,114,501 | France | Dec. 19, 1955 |
| 969,690 | Germany | July 3, 1958 |
| 802,206 | Great Britain | Oct. 1, 1958 |